(12) United States Patent
Demers

(10) Patent No.: US 6,912,837 B2
(45) Date of Patent: Jul. 5, 2005

(54) FAIL FIXED FUEL METERING DEVICE AND METHOD FOR PROVIDING BUMPLESS TRANSFER TO BACKUP

(75) Inventor: Dennis G. Demers, Mishawaka, IN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/773,359

(22) Filed: Feb. 6, 2004

(65) Prior Publication Data

US 2005/0109035 A1   May 26, 2005

Related U.S. Application Data

(62) Division of application No. 10/171,951, filed on Jun. 14, 2002, now Pat. No. 6,715,278.
(60) Provisional application No. 60/326,614, filed on Oct. 2, 2001.

(51) Int. Cl.[7] .............................................. F02C 9/28
(52) U.S. Cl. ................................................ 60/39.281
(58) Field of Search ........................... 60/39.281, 734, 60/773

(56) References Cited

U.S. PATENT DOCUMENTS

| | | | |
|---|---|---|---|
| 3,820,323 A | 6/1974 | Burnell et al. | |
| 3,840,200 A * | 10/1974 | Lambregts | 60/39.281 |
| 4,137,707 A | 2/1979 | Wanger | |
| 4,276,809 A | 7/1981 | Kast | |
| 4,551,972 A * | 11/1985 | Lewis | 60/39.281 |
| 4,608,820 A | 9/1986 | White et al. | |
| 4,718,229 A | 1/1988 | Riley | |
| 5,490,379 A | 2/1996 | Wernberg et al. | |
| 5,555,720 A | 9/1996 | Wernberg et al. | |
| 5,613,652 A * | 3/1997 | Greene | 60/39.281 |

* cited by examiner

Primary Examiner—Louis J. Casaregola
(74) Attorney, Agent, or Firm—Larry J. Palguta

(57) ABSTRACT

A fuel metering device (101) and method for metering fuel to an engine (129) provides bumpless transfer to a backup mode. A common cavity (125) provides pressure relief, fuel metering and bypass of fuel flow. A metering valve (120) for scheduling fuel flow to the engine (129) and the metering valve (120) is controlled in either a primary mode or a backup mode. A pressure relief valve (123) limits the maximum pump discharge pressure of a fuel pump. A bypass valve (122) maintains a constant pressure across the metering valve (120) by redirecting non-metered fuel flow back to a pump stage inlet. An electrical clutch (131) determines whether the metering valve (120) function is accomplished by said primary mode or said backup mode. Bumpless transfer to a backup is accomplished automatically.

28 Claims, 2 Drawing Sheets

FAIL FIXED FUEL METERING DEVICE AND METHOD FOR PROVIDING BUMPLESS TRANSFER TO BACKUP

RELATED APPLICATION

This application is a division of and claims priority to application Ser. No. 10/171,951, filed Jun. 14, 2002 now U.S. Pat. No. 6,715,278, the entire contents of which are hereby incorporated by reference. This application claims priority under 35 U.S.C. §119(e) to Provisional Application of U.S. Provisional Application No. 60/326,614 filed on Oct. 2, 2001, the entire contents of which are herein incorporated by reference.

FIELD OF THE INVENTION

The present invention relates to an electronically controlled fuel metering system.

BACKGROUND OF THE INVENTION

Many types of aircraft, such as helicopters, typically use an electronically controlled fuel metering system that fails at a fixed metered level of fuel in the event of losing primary power. Additionally, upon losing primary power, it is highly desirable that the subsequent transfer to backup mode be completed in a manner that will not require an additional workload to be imposed on the pilot of the aircraft. A backup mode is an alternative operational mode that is executed when a primary (or a normal operational mode) encounters a partial or total failure. This type of smooth transfer to a backup mode is facilitated by a fuel metering system that does not change or impede fuel flow. This type of unchanging, non-impeded fuel flow is known as a bumpless transfer. A bumpless transfer is also a transient free or smooth transfer that is transparent to a user or system undergoing the bumpless transfer.

SUMMARY OF THE INVENTION

According to an aspect of the present invention, a fuel metering device for metering fuel to an engine provides bumpless transfer to backup. This fuel metering device comprises a common cavity for providing fuel flow pressure relief, fuel metering and bypass of fuel flow to a flow of fuel entering the common cavity. A metering valve schedules fuel flow to the engine and the metering valve is controlled in either a primary mode or a backup mode. A pressure relief valve controls and limits the maximum pump discharge pressure of a fuel pump. A bypass valve maintains a constant pressure across the metering valve by redirecting non-metered fuel flow back to a pump stage inlet. An electrical clutch selectively determines whether the metering valve function is accomplished by the primary mode or the backup mode; and the bumpless transfer to the backup mode is accomplished automatically.

According to another aspect of the present invention, a fuel metering method for metering fuel to an engine provides bumpless transfer to backup. The method includes forwarding fuel flow into a common cavity and providing pressure relief, fuel metering and bypassing of fuel flow in a common cavity. Fuel flow is scheduled to the engine and the metering valve is controlled in either a primary mode or a backup mode. The maximum pump discharge pressure of a fuel pump is controlled and limited. A constant pressure is maintained across the metering valve by redirecting non-metered fuel flow back to a pump stage inlet. An electrical clutch is used to selectively determine whether the metering valve function is accomplished by the primary mode or the backup mode; and the bumpless transfer to a backup is accomplished automatically.

BRIEF DESCRIPTION OF THE DRAWINGS

A more complete understanding of the present invention will become apparent from the following description taken in conjunction with the accompanying drawing, wherein.

DETAILED DESCRIPTION OF THE PREFERRED EMBODIMENTS

Aspects of the invention are disclosed in the accompanying description. Alternate embodiments may be devised without departing from the spirit or the scope of the invention.

Figure 1:
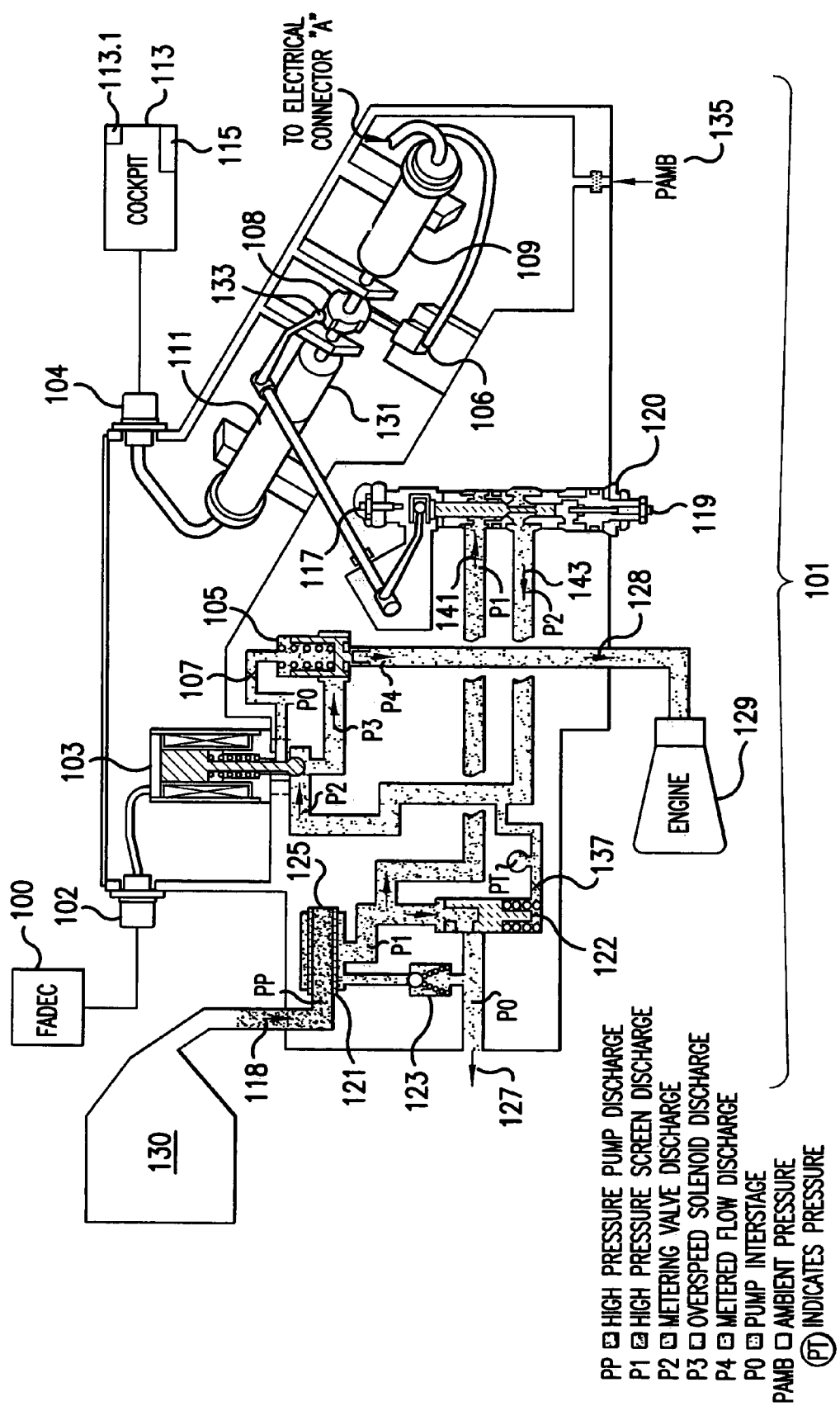
FIG. 1 is a schematic illustration of one exemplary embodiment of a main fuel control (MFC) device for achieving fail fixed fuel metering.

FIG. 1 illustrates one exemplary embodiment of the present invention as applied to a rotary wing aircraft, such as a helicopter. In the embodiment of FIG. 1, the MFC device 101 performs various fuel management and control functions when operating in conjunction with a single channel full authority digital electronic control (FADEC) 100.

There are at least two electrical connector receptacles provided on the MFC device 101 to provide electrical power and signal connections to the MFC device 101 from external devices connected to it, including at least an airframe connector 104 and a FADEC connector 102. The airframe connector 104 carries electrical power and signals for a manual beeper motor 111 (disclosed below) and an electrical clutch 131. The FADEC connector 102 carries driver current and feedback signals for a primary mode stepper motor 109 and driver current for a solenoid 103.

The electrical devices and components of the MFC 101 can be grouped and operated in an air environment under a common electromagnetic interference (EMI) cover (not shown). This packaging configuration facilitates any potential upgrade to a dual channel system. For certain applications, a dual channel system is used, whereby dual (two) primary stepper motors and associated feedback devices are operated in parallel in order to achieve higher reliability levels and more fault tolerant systems. If one primary stepper motor or position feedback device experiences a failure, a second primary stepper motor or position feedback device takes over, without reverting back to the manual beeper mode.

The MFC device 101 is composed of a primary mode fuel metering section and a backup mode fuel metering section. These sections of the MFC device 101 are those portions of the system that perform the different modes. The primary mode is defined as the operation mode of the MFC device 101 working under FADEC 100 control. The primary mode is an automatic mode of operation that does not require manual intervention. The components making up the primary mode fuel metering section include the electrical connector 102, solenoid 103, pressuring valve 105, motor position feedback control 106, damping restrictor 107, cam 108, stepper motor 109, maximum flow adjustment of the metering valve 117, fuel pump gear stage 118, minimum flow adjustment of the metering valve 119, metering valve 120, screen 121, bypass valve 122, pump pressure relief valve 123, common cavity 125, metered flow discharge 128, torque tube linkage arrangement 133, ambient pressure vent 135, and damping restrictor 137.

The backup mode is defined as the operation mode of the MFC device 101 working under the control of a pilot in a cockpit 113. The backup mode is a manual mode of operation that requires pilot intervention through a switch or switches in the cockpit 113. The components making up the backup mode fuel metering section include the electrical connector 102, solenoid 103, electrical connector 104, pressuring valve 105, damping restrictor 107, cam 108, beeper motor 111, maximum flow adjustment of the metering valve 117, fuel pump gear stage 118, minimum flow adjustment of the metering valve 119; metering valve 120, screen 121, bypass valve 122, pump pressure relief valve 123, common cavity 125, metered flow discharge 128, electrical clutch 131, torque tube linkage arrangement 133, ambient pressure vent 135, and damping restrictor 137.

The MFC 101 delivers a metered fuel flow discharge 128 to an engine 129 in response to FADEC 100 electrical signals in the primary mode and in response to a pilot activated electrical beep switch 115 in the backup mode. The beep switch 115 is manually operated by the pilot and controls the manual beeper motor 111 in the backup mode. Beep motors are well known to those skilled in the helicopter art and allow the pilot to manually beep up or beep down the speed of the rotor.

Fuel from a fuel tank or fuel supply 130 is discharged via a fuel pump gear stage 118 and enters the MFC device 101 where it is filtered through a screen 121 before entering a common cavity 125. This filtering screen 121 can be a high pressure fuel inlet screen and captures any contaminants or particles that may be present in the fuel. The common cavity 125 supplies pressure relief to the fuel flow through a pump pressure relief valve 123, metering of the fuel flow by a metering valve 120, and permits a proportional flow of fuel through a bypass valve 122, if there is an excess of fuel causing an undesired pressurization level of the fuel in the MFC.

The pump pressure relief valve 123 limits the maximum pump discharge pressure exiting from the common cavity 125. Any fuel flow that is not needed during operation exits the MFC device 101 to the pump interstage 127 and recirculated through the fuel pump. A fuel pump typically contains two stages: a boost stage and a gear stage. The boost stage receives fuel from a fuel tank and discharges it to the gear stage. The type of boost stage used can vary depending upon the performance requirements of the pump, but it essentially conditions the fuel going into the gear stage by increasing or boosting the pressure level. Bypassed fuel from the MFC device 101 enters the pump interstage 117 between the boost and gear stages.

In FIG. 1, ambient pressure equalization of the compartment housing the solenoid 103, the beeper motor 111, the stepper motor 109 and a stepper motor position feedback 106 (discussed later) is maintained by the ambient pressure vent 135.

The proportional bypass valve 122 maintains a constant pressure (P) across the metering valve 120 by sensing pressure P1 141 and pressure P2 143 that exist across the metering valve 120 by redirecting non-metered flow back to the pump interstage 127. Pressure P1 141 is measured at one end of the proportional bypass valve 122 and P2 143 is measured at the opposite (spring) end of the valve. The metering valve 120 schedules flow to the engine as commanded by either the primary mode or backup modes of operation. The fuel flow within the MFC device 101 is calibrated and sized to a specific engine size and configuration by using a maximum flow adjustment mechanism 117 and a minimum flow adjustment mechanism 119. An electrical clutch 131 selectively determines whether the metering valve 120 function is accomplished by the primary or the backup system. Those skilled in the art will appreciate that a clutch, such as the electrical clutch 131 shown in FIG. 1, applies a clamping force that engages or disengages disks which are attached between a motor drive shaft and a clutch output shaft.

In the primary mode, fuel metering is controlled by an electrical signal sent from the FADEC 100 to the stepper motor 109. The stepper motor 109 rotates a two-dimension cam 108 that performs a dual function. One function of the cam 108 is to provide a contour that positions the metering via a torque tube that forms part of a metering valve linkage arrangement 133. Another function of the cam 108 is to provide a position feedback contour for an electrical position sensor to maintain closed loop motor position feedback control 106 of the stepper motor 109. A metering valve 120 linkage arrangement 133 is mechanically preloaded against the cam 108 contour. The holding torque of the stepper motor 109 retains the metering valve 120 in a fixed position when the stepper motor 109 is not powered.

A transfer into the backup mode is accomplished when the power is applied to the electrical clutch 131 connected to the beeper motor 111. The beeper motor 111 is connected to a manual control mechanism 115 that the pilot uses to beep up (increase metered fuel flow) or beep down (decrease metered fuel flow) the beeper motor 111.

The transfer into backup mode can be accomplished in one of two ways. The transfer may occur automatically as scheduled by the FADEC 100 in the event of the loss of primary power or manually at the pilot's option by a switch in the cockpit 113. This action engages the backup DC motor 111 with the cam 108. The beeper motor 111 connects to the electrical connector 104, which then provides an electrical connection to the cockpit 113.

An electrical switch 113.1 in the cockpit 113 sends electrical signals to a DC motor 111 to rotate the cam 108, back drive the stepper motor 109, and thereby control the metered flow of fuel. The DC motor 111 speed and reduction gearing are selected to limit the rate of fuel flow change and the metered flow of fuel discharged 128 to the engine 129. This helps prevent surge or flameout of the engine 129 connected to the MFC device 101.

Fuel flow discharged from the metering valve 120 passes through the normally open solenoid 103. This solenoid 103 controls a valve that terminates and bypasses metered flow to the pump interstage 117 when commanded by an electrical signal from the electronic control.

Typically, the manufacturers of engines want to have the capability to terminate fuel flow to the engine for either one of two reasons. One reason is that the pilot has landed and wants to shut off the fuel flow to an engine. Another reason is that an occurrence of an engine overspeed condition has been sensed. If the pilot wants to shutoff fuel flow to the engine, the pilot uses a switch to send an electrical signal to the FADEC 100 which in turn energizes the solenoid 103 to terminate fuel flow. If the FADEC 100 senses an engine overspeed condition, the FADEC 100 in communication with the solenoid 103 automatically terminates the fuel flow. Damping restrictors 107 and 137 are selected and sized to provide stability and damping of the fuel flow passing through the restrictors.

This feature of returning metered flow back to pump interstage during shutoff prevents dead heading of a fuel pump and subsequent forced operation on the pressure relief valve 123 during shutdown. Dead heading of a fuel pump results from the following situation. If the solenoid 103 suddenly terminates fuel flow, there is a brief increment of time when the fuel pump is pushing more fuel flow into the 118 region shown in FIG. 1 than the bypass valve 122 is able to handle. The solenoid 103 (includes a valve as part of the solenoid 103 as shown in FIG. 1) controlling a valve has an operation or reaction speed that operates much faster (e.g., 5 times faster) than the bypass valve 122. This produces a momentary dead heading of the pump and the pressure rises high enough to activate the pressure relief valve 123. In other words, the pump would be dead headed if all of its discharge flow had nowhere to go.

Fuel flow exits the MFC device 101 after it passes through a pressuring valve 105. The pressuring valve 105 has two functions. The pressuring valve 105 provides a drip tight seal until the solenoid 103 controlled valve has been opened and the fuel pump 118 has generated a predetermined pressure. The pressurizing valve 105 also allows the bypass valve 122 to stay in regulation at low nozzle manifold pressures when pump inlet pressures are high.

Figure 2:
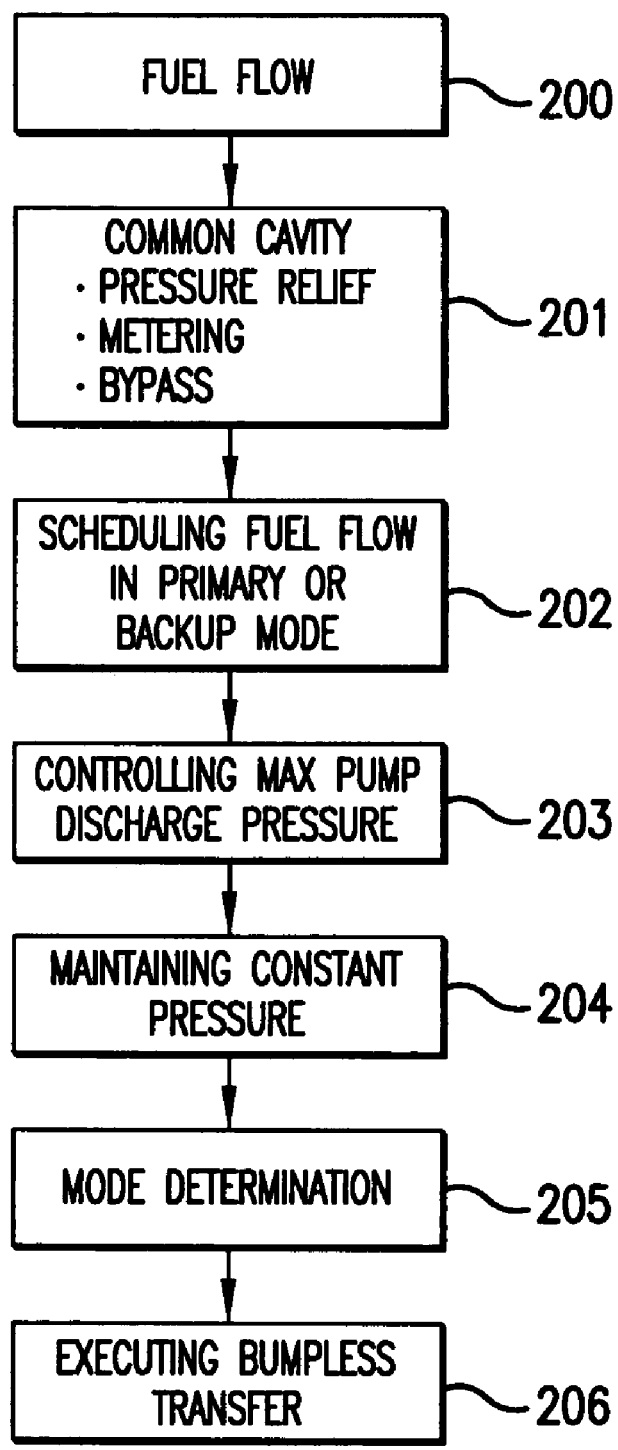
FIG. 2 is a block diagram of a method for achieving fail fixed fuel metering.

In FIG. 2 a method for the fuel metering device is described. In step 200, fuel flows into the system from an external source or reservoir. In step 201, a common cavity provides fuel flow pressure relief, fuel flow metering and fuel flow bypass. In step 202, the fuel flow is scheduled depending upon whether the system is in a primary or backup mode. In step 203, maximum pump discharge pressure is controlled using a pressure relief valve. In step 204, constant pressure is maintained in the system by maintaining a constant pressure across a metering valve by redirecting non-metered fuel flow back to a pump stage inlet. In step 205, an electrical clutch selectively determines whether the metering valve function is accomplished by the primary or backup mode. In step 206, the bumpless transfer to backup mode is accomplished automatically.

What is claimed is:

1. A fuel metering method for metering fuel to an engine providing bumpless transfer to backup comprising the steps of:
   forwarding fuel flow into a common cavity;
   providing pressure relief, fuel metering and bypassing of fuel flow in said common cavity;
   scheduling fuel flow to said engine in accordance with either a primary mode or a backup mode;
   controlling and limiting the maximum pump discharge pressure of a fuel pump;
   maintaining a constant pressure across a metering valve by redirecting non-metered fuel flow back to a pump stage inlet; and
   using an electrical clutch to selectively determine whether the metering valve function is accomplished by said primary mode or said backup mode wherein said bumpless transfer to said backup mode is accomplished automatically.

2. The fuel metering method of claim 1 wherein fuel metering in said primary mode is controlled by an electrical signal from a full authority digital electronic control (FADEC) system.

3. The fuel metering method of claim 1 wherein transfer into said backup mode is automatic upon loss of primary power and is selectable by an electrical switch in a cockpit.

4. The fuel metering method of claim 2 wherein said backup mode operates independently from the FADEC system.

5. The fuel metering method of claim 2 wherein fuel metering in the primary mode is controlled by an electrical signal from the FADEC to a stepper motor.

6. The fuel metering method of claim 5 wherein said motor rotates a two-dimension cam.

7. The fuel metering method of claim 6 wherein said cam provides a contour that positions said metering valve using a metering valve linkage arrangement.

8. The fuel metering method of claim 6 wherein said cam provides a feedback contour for an electrical position sensor to maintain closed loop control of said stepper motor.

9. The fuel metering method of claim 7 wherein said metering valve linkage arrangement is mechanically pre-loaded against a contour of said cam.

10. The fuel metering method of claim 5 wherein said stepper motor has a holding torque and said holding torque retains said metering valve in a fixed position when said stepper motor is not powered.

11. The fuel metering method of claim 1 wherein transfer to said backup mode is accomplished when power is applied to a DC motor electrical clutch.

12. The fuel metering method of claim 11 wherein said DC motor is a beeper motor.

13. The fuel metering method of claim 12 wherein a transfer into said backup mode is accomplished when power is applied to an electrical clutch of said beeper motor.

14. The fuel metering method of claim 13 wherein said transfer into backup mode occurs automatically as scheduled and executed by a full authority digital electronic control (FADEC) system or manually by an electrical switch in said cockpit.

15. The fuel metering method of claim 13 wherein said transfer initiates an action that engages a backup DC motor with the scheduling cam.

16. The fuel metering method of claim 15 wherein an electrical cockpit switch sends electrical signals to said backup DC motor to rotate the cam and backdrive said stepper motor.

17. The fuel metering method of claim 16 wherein said DC motor speed and reduction gearing are selected to limit the rate of fuel flow change.

18. The fuel metering method of claim 17 wherein said fuel flow change is controlled to prevent engine surge or engine flameout.

19. The fuel metering method of claim 1 wherein the fuel flow discharged from said metering valve passes through a normally open overspeed/shutoff solenoid valve.

20. The fuel metering method of claim 19 wherein said solenoid valve terminates and bypasses metered fuel flow to a pump interstage upon receiving an electrical signal from a full authority digital electronic control (FADEC) system.

21. The fuel metering method of claim 1 wherein fuel flow exits said fuel metering device after passing through a pressuring valve.

22. The fuel metering method of claim 21 wherein fuel flow discharged from said metering valve passes through a normally open overspeed/shutoff solenoid valve and said pressuring valve provides a drip tight seal until said solenoid valve in a shutoff mode has been opened and said fuel pump has generated a predetermined pressure.

23. The fuel metering method of claim 21 wherein said pressuring valve allows a bypass valve to stay in regulation at low manifold pressure when pump inlet pressures are high.

24. The fuel metering method of claim 1 wherein electrical connectors connect to a main fuel control (MFC).

25. The fuel metering method of claim 24 wherein at least one electrical connector is an airframe connector and said airframe connector carries signals for a manual beeper motor and said electrical clutch.

26. The fuel metering method of claim 24 wherein at least one electrical connector is a FADEC connector and said FADEC connector carries signals for a primary mode stepper motor and the driver current for shutoff and manual transfer solenoids.

27. The fuel metering method of claim 1 wherein all electrical components are shielded under an electromagnetic interference (EMI) cover.

28. The fuel metering method of claim 27 wherein said fuel metering method is carried out using a fuel metering device that is upgradeable to a dual channel system.

* * * * *